(12) United States Patent
Cesareo et al.

(10) Patent No.: US 10,435,837 B2
(45) Date of Patent: Oct. 8, 2019

(54) CONCENTRATED WATER DISPERSION OF GRAPHENE AND METHOD FOR THE PREPARATION THEREOF

(71) Applicant: DIRECTA PLUS S.P.A., Lomazzo (IT)

(72) Inventors: Giulio Cesareo, Como (IT); Maria Riccardo Parrini, Milan (IT); Laura Giorgia Rizzi, Saronno (IT)

(73) Assignee: DIRECTA PLUS S.P.A., Lomazzo (IT)

( * ) Notice: Subject to any disclaimer, the term of this patent is extended or adjusted under 35 U.S.C. 154(b) by 770 days.

(21) Appl. No.: 14/772,764

(22) PCT Filed: Feb. 28, 2014

(86) PCT No.: PCT/EP2014/053966
§ 371 (c)(1),
(2) Date: Sep. 3, 2015

(87) PCT Pub. No.: WO2014/135455
PCT Pub. Date: Sep. 12, 2014

(65) Prior Publication Data
US 2015/0376014 A1  Dec. 31, 2015

(30) Foreign Application Priority Data
Mar. 6, 2013 (IT) .............................. MI2013A0334

(51) Int. Cl.
| C08K 3/04 | (2006.01) |
| D06M 11/74 | (2006.01) |
| B82Y 30/00 | (2011.01) |
| B82Y 40/00 | (2011.01) |
| C01B 32/19 | (2017.01) |
| C01B 32/194 | (2017.01) |
| C09D 7/61 | (2018.01) |

(52) U.S. Cl.
CPC ............ *D06M 11/74* (2013.01); *B82Y 30/00* (2013.01); *B82Y 40/00* (2013.01); *C01B 32/19* (2017.08); *C01B 32/194* (2017.08); *C08K 3/04* (2013.01); *C08K 3/042* (2017.05); *C09D 7/61* (2018.01); *C01B 2204/32* (2013.01)

(58) Field of Classification Search
CPC ... C01B 31/0484; C01B 32/194; C01B 32/19; C08K 3/042; C08K 3/04; C09D 7/61; B82Y 30/00; B82Y 40/00; D06M 11/74

USPC .......................................................... 442/59
See application file for complete search history.

(56) References Cited

U.S. PATENT DOCUMENTS

2008/0206124 A1* 8/2008 Jang ...................... B82Y 30/00
423/415.1

FOREIGN PATENT DOCUMENTS

| CN | 101830458 A | 9/2010 |
| WO | WO 2008/060703 A2 | 5/2008 |

OTHER PUBLICATIONS

PCT International Searching Authority, "International Search Report", International Application No. PCT/EP2014/053966, dated Jun. 18, 2014 (5-pgs).
PCT International Searching Authority, "Written Opinion of the International Searching Authority", International Application No. PCT/EP2014/053966, dated Jun. 18, 2014, (7-pgs).
I. Guardia et al., "High-throughput production of pristine graphene in an aqueous dispersion assisted by non-ionic surfactants," Carbon, vol. 49 (2011) pp. 1653-1652.
Mustafa Lotya et al., "High-Concentration, Surfactant-Stabilized Graphene Dispersions," American Chemical Society, vol. 4, No. 6 (2010) pp. 3155-3162.
Thomas J. Manning et al., "Synthesis of exfoliated Graphite from fluorinated graphite using an atmospheric-pressure argon plasma," Carbon, vol. 37, (1999) pp. 1159-1164.
State Intellectual Property of the P.R. China, "Notification of First Office Action", Application No. 2014800101316; dated Jul. 26, 2016, 6 pages.

* cited by examiner

*Primary Examiner* — Vincent Tatesure
(74) *Attorney, Agent, or Firm* — Pillsbury Winthrop Shaw Pittman LLP

(57) ABSTRACT

Concentrated dispersion from 5 to 50% by weight of nanoparticles of graphene in water with a lateral size from 10 to 5000 nm and thickness from 0.34 to 30 nm. The production process comprises the dispersion in water of flakes of expanded graphite and the subsequent treatment with ultrasounds at an energy level of from 100 to 2000 W for a period from 1 to 100 hours.

9 Claims, No Drawings

CONCENTRATED WATER DISPERSION OF GRAPHENE AND METHOD FOR THE PREPARATION THEREOF

This application is a national stage entry from International Application Number PCT/EP2014/053966 filed Feb. 28, 2014, which in turn claims priority to Italian Application Number MI2013A000334, filed Mar. 6, 2013, each of which is incorporated herein by reference in its entirety.

The present invention relates to a concentrated water dispersion of graphene and to a method for the preparation thereof.

Graphene is a material formed by a single atomic layer of $sp^2$ hybridized carbon atoms. These are arranged in hexagonal close-packed honeycomb structures that form the fundamental structural elements of graphite, of carbon nanotubes and of fullerenes.

Graphene is a material with unique properties: it is a zero band-gap semiconductor with high charge carrier mobility (up to 200,000 $cm^2/Vs$), very high mechanical strength (tensile strength ~40 N/m, Young's Modulus ~1.0 TPa), exception thermal conductivity (~5000 W/Km) and high electric current carrying capacity (~1.2 $mA/\mu m$). These properties allow graphene to be used for applications in market segments that require the use of advanced materials. Therefore, graphene based materials are studied from a scientific and industrial point of view for applications in markets such as electronics, photovoltaics, batteries, sensors, optoelectronics and nanocomposites.

Scientific and patent literature describes various methods for the preparation of graphene, such as chemical vapor deposition, epitaxial growth, chemical exfoliation and chemical reduction of the oxidized form graphene oxide (GO).

The Applicant Directa Plus S.p.A. is the holder of European patent EP 2 038 209 B1, which describes and claims, among other things, a method for producing structures comprising graphene layers, obtained by intercalation and subsequent expansion/exfoliation of graphite.

US 2011/0017585 A1 describes the production of nano graphene platelets (NGPs,) by means of ultrasonication of pristine graphite dispersed in a liquid without surfactants. The liquid used must have a low surface tension, to ensure high wettability of the graphene. By studying the surface tension of many solvents it was found that the thickness of the nano graphene platelets obtained depended on the contact angle with the liquid, defined "solvent". All solvents used were organic solvents. The solvents used in the examples were n-heptane, glycerol and benzene. The description indicates the possibility of obtaining dispersions having a concentration of starting material (graphite) higher than 0.1 mg/mL, generally higher than 1 mg/mL, more frequently higher than 10 mg/mL (1% weight). The examples refer to dispersions having concentrations of 0.5% weight.

US 2008/0279756 A1 describes a method of producing exfoliated graphite, flexible graphite and nano graphene platelets (NGPs). The method comprises the dispersion of graphite particles or of graphite oxide in water followed by ultrasonication treatment at an energy level sufficient to generate platelets of nanometric dimension. The description (paragraph [0042]) refers to particles with lateral sizes lower than 100 nm. Example 5 describes ultrasonication treatment of a water dispersion of NGPs at 2% by weight, in the presence of a surfactant, but does not indicate the dimensions of the NGPs obtained. Dispersions with graphene concentration higher than 2% are not described.

U.S. Pat. No. 8,222,190 B2 describes a nano-graphene modified lubricant, comprising nano graphene platelets (NGPs) dispersed in a lubricating fluid based on petroleum oil or synthetic oil at a concentration from 0.001% to 75% by weight, preferably from 0.001% to 60% by weight.

Example 1 describes the production of ultra-thin graphene sheets by means of ultrasonication of graphite flakes dispersed in water at the concentration of 0.5% for 2 hours and subsequent spray-drying of the dispersion obtaining dried NPGs with a thickness of 1-5 graphene layers.

Example 4 describes the production of various lubricant compositions comprising NPGs dispersed in α-olefin or polyolefin at the concentration of 2.5% by weight (sample 1) and 45% by weight (sample 5).

Therefore, dispersions of graphene either at low concentration or comprising organic solvents or even liquids formed by α-olefin oligomers are known. In fact, the hydrophobic nature of graphene means that the use of water is avoided as liquid medium of the dispersion. This hydrophobic nature instead leads to the use of organic solvents, which are both costly and problematic from a safety and environmental point of view.

However, the majority of industrial applications of graphene mentioned above rely on the availability of graphene preferably in a form that is concentrated, easy-to-use, relatively inexpensive and safe from a health and environmental point of view.

An object of the present invention is therefore to provide a dispersion of graphene in relatively concentrated form, produced with a liquid medium that is readily available, inexpensive and very safe from a health and environmental perspective.

Another object of the present invention is to provide a safe and reliable process for preparing a dispersion of graphene as described above that enables graphene to be obtained in a very pure form and with a minimum amount of oxidized product.

The aforesaid and other objects and advantages of the invention are achieved with a dispersion of nanoparticles of graphene in water in the presence of a surfactant, characterized in that:
- the concentration of the nanoparticles of graphene in water is from 5% to 50% by weight;
- the C/O ratio in said nanoparticles of graphene is ≥100:1;
- at least 90% of said nanoparticles of graphene have a lateral size (x, y) from 10 to 10,000 nm, and a thickness (z) from 0.34 to 30 nm, the lateral size being always greater than the thickness (x, y>z);
- the surfactant is present in an amount from 1 to 20% by weight with respect to the weight of said graphene and is an anionic surfactant or a nonionic surfactant or a mixture of these.

According to the invention, a process for producing a dispersion of nanoparticles of graphene in water comprises the expansion of flakes of intercalated graphite having a lateral size of ≤500 μm by exposure thereof to a temperature of at least 1300° C. for a time of less than 1 second, and is characterized in that:
a) the expanded graphite so obtained is dispersed in water at a concentration from 5% to 50% by weight, in the presence of a surfactant in an amount from 1 to 20% by weight with respect to the weight of said graphite, said surfactant being an anionic surfactant or a nonionic surfactant or a mixture of these;
b) the water dispersion obtained from step a) is treated with ultrasounds at an energy level from 100 to 2000 W for a period of from 1 to 100 hours.

The aforesaid process enables a dispersion of nanoparticles of graphene having the characteristics defined above to be obtained.

In the present description the size of the nanoparticles of graphene is defined with reference to a system of Cartesian axes x, y, z, it being understood that the particles are substantially flat platelets but may also have an irregular shape. In any case, the lateral size and the thickness provided with reference to the directions x, y and z must be intended as the maximum sizes in each of the aforesaid directions.

The lateral sizes (x, y) of the nanoparticles of graphene are determined by direct measurement on the scanning electron microscope (SEM), after having diluted the dispersion in a ratio of 1:1000 in deionized water and added it dropwise to a silicon oxide substrate placed on a plate heated to 100° C.

The thickness (z) of the nanoparticles of graphene is determined with the atomic force microscope (AFM), which is essentially a profilometer with subnanometer resolution, widely used for characterization (mainly morphological) of surfaces and of nanomaterials. This type of analysis is commonly used (both for academic purposes and in industrial R&D) to evaluate the thickness of the graphene flakes, produced with any method, and to detect the number of layers forming the flake (single layer=0.34 nm).

The particles of the dispersion, deposited as described for SEM analysis, are scanned directly with an AFM tip, where the measurement provides a topographical image of the graphene flakes and their profile with respect to the substrate, enabling precise measurement of the thickness.

In the dispersion according to the invention at least 90% of the nanoparticles of graphene preferably have a lateral size (x, y) from 50 to 5,000 nm, more preferably from 100 to 2,000 nm.

In the dispersion according to the invention the nanoparticles of graphene preferably have a thickness (z) from 0.34 to 20 nm, more preferably from 0.34 to 15 nm.

In any case, the lateral size is always greater than the thickness (x, y>z).

In the dispersion according to the invention the C/O ratio in said nanoparticles of graphene is ≥100:1; preferably ≥150:1. This ratio is important as it defines the maximum amount of oxygen bonded to the carbon forming the graphene, i.e. of graphene oxide. It is in fact known that the best properties of graphene are obtained when the amount of graphene oxide is minimum. On the other hand, the polar character of the graphene oxide makes it more hydrophilic and therefore suitable for the formation of water dispersions. One of the technical problems solved by the invention is therefore that of obtaining concentrated dispersions of graphene in water while maintaining the content of graphene oxide very low, as defined above.

The C/O ratio in the graphene of the dispersion according to the invention is determined by elementary analysis performed by Inductively Coupled Plasma Mass Spectrometry (ICP-MS), which provides the percentage by weight of the various elements. By normalizing the values obtained with respect to the atomic weight of the C and O species and finding their ratio, the C/O ratio is obtained.

The term "concentrated dispersion of graphene in water" is intended as a dispersion from 5% to 50% by weight of nanoparticles of graphene, preferably from 7% to 50% by weight, more preferably from 7% to 40% by weight.

Dispersions having these concentrations of graphene are advantageous for the use of graphene in numerous industrial applications, such as:

use as additive or component of elastomeric compositions for tires, where it is advantageous to reach graphene levels of 10-15% by weight in order to achieve desired properties such as: i) an improved gas barrier effect, with consequent increase of impermeability, causing the tire to deflate more slowly; ii) improvement of the mechanical dynamic properties, in particular rolling resistance; iii) increase of thermal conductivity, useful for heat dissipation; iv) increase of electrical conductivity, useful for the dissipation of electrostatic energy;

use as additive or component of paints and silicon compositions, where it is advantageous to reach graphene levels of 20-30% by weight in order to achieve desired properties, such as: i) increase of thermal conductivity for heat dissipation, ii) increase of electrical conductivity, to reach conductive compounds; iii) gas and liquid barrier effect with consequent increase of impermeability, to give anticorrosion and antifouling properties;

use as additive or component in compositions for treating articles such as textiles, where it is advantageous to reach graphene levels of up to 40% by weight in order to achieve desired properties, such as: i) good electrical conductivity, for producing "intelligent" textiles; ii) good thermal conductivity; iii) liquid barrier effect; iv) flame retardant properties; v) EM and IR shielding.

In some applications, for example in the treatment of textiles, the direct use of suspensions of graphene in water is possible, as the preparation of a dispersion or suspension to apply to the textile is in any case required, according to various technical processes available to those skilled in the art.

In the dispersion according to the invention the surfactant is present in an amount from 1 to 20% by weight with respect to the weight of said graphene, preferably from 5 to 15% by weight. It has the function of dispersing medium and contributes to the stability of the dispersion in time. The surfactant is selected from anionic surfactants or nonionic surfactants or mixtures thereof. Preferred anionic surfactant are those in which the anion forming the hydrophilic polar group is selected from sulfonate, sulfate, carboxylate and the hydrophobic nonpolar part is selected from structures comprising aromatic rings such as benzene, naphthalene, pyrene or cyclic aliphatic structures such as derivatives of cholic acid. Suitable derivatives of cholic acid are the anions deoxychlate (DOC) and taurodeoxycholate (TDOC). A particularly preferred surfactant is sodium benzenesulfonate.

Nonionic surfactants are long-chain molecules having a polar but uncharged head. Preferred non ionic surfactants are polyoxyethylene glycol alkyl ethers, polyoxypropylene glycol alkyl ethers and polyvinylpyrrolidone. A particularly preferred nonionic surfactant is polyvinylpyrrolidone.

The dispersion of graphene according to the invention is prepared with a process involving several steps.

The first step of the process consists in the preparation of expanded and/or exfoliated graphite starting from intercalated graphite.

The intercalated graphite can be prepared with methods known to those skilled in the art or purchased on the market. The expansion step of the intercalated graphite is performed by exposing flakes of intercalated graphite (Graphite Intercalation Compounds, GICs) having a lateral size ≤500 μm to a temperature of at least 1300° C. for a time of less than 1 second. This treatment is performed as described in EP 2 038 209 B1, i.e. by generating heat within the GICs, preferably using an electric arc, a microwave or induction furnace at high frequency or by plasma formation. This last treatment is particularly preferred as it is possible to reach the temperature required associated with high turbulence.

The second step of the process comprises the dispersion in water of the expanded graphite obtained in the first step. Dispersion is obtained by light stirring. Dispersion is performed in the presence of a surfactant in an amount from 1 to 20% by weight with respect to the weight of the graphite, preferably from 5 to 15% by weight. The surfactant is an anionic or nonionic surfactant, preferably an anionic surfactant in which the anion forming the hydrophilic polar group is selected from sulfonate, sulfate, carboxylate and the hydrophobic nonpolar part is selected from structures comprising aromatic rings such as benzene, naphthalene, pyrene or cyclic aliphatic structures such as derivatives of cholic acid. A particularly preferred surfactant is sodium benzenesulfonate.

The expanded graphite is dispersed in water at a concentration from 5% to 50% by weight, preferably from 7% to 50% by weight, more preferably from 7% to 40% by weight.

The third step of the process comprises treatment of the water dispersion obtained in the preceding step with ultrasounds at an energy level from 100 to 2000 W for a period of from 1 to 100 hours.

Preferably the treatment of the water dispersion of expanded graphite with ultrasounds is performed an energy level from 200 to 1000 W for a period of from 2 to 80 hours.

The treatment with ultrasounds is performed using an apparatus such as commercial ultrasonicators for treating liquids, where the acoustic energy is transmitted to the system by cavitation (formation and implosion of bubbles) using a sonotrode immersed in the liquid, with wave frequency of around 24 kHz, and with power as defined above.

The combination of the expansion treatment of the intercalated graphite at high temperature and of the subsequent ultrasonication treatment in a water medium enables both an exfoliation of the graphite and a reduction in the size thereof to be performed, obtaining nanoparticles of graphene directly dispersed in water, in relatively rapid times.

Moreover, the process described above makes it possible to obtain dispersions of graphene in water having higher concentrations than those obtained with prior art processes.

The availability of concentrated dispersions having up to 50% weight of nanoparticles of graphene of very small size represents a substantial improvement compared to the prior art, both from the point of view of performance of the dispersion and of its processability.

From the point of view of performance, it was found that the fine particles of graphene of very small size interact optimally with the host matrix to which the dispersion is applied, whatever it be. The relatively limited amount of surfactant interferes negligibly with the physical properties of the graphene.

From the point of view of processability it was found that the high concentration makes it possible to reduce the volumes of suspension treated with the same amounts of graphene to be applied to a given substrate, making the process of applying the graphene to the substrate or matrix involved more manageable and less costly.

The invention will now be described by means of some embodiments provided merely by way of example.

EXAMPLE 1

75 g of grade ES 250 F5 commercially available intercalated graphite (hereinafter IG), marketed by Graphit Kropfmühl AG, having a lateral size of around 300 μm, were expanded by insertion into an induction plasma with the following characteristics:
Type of gas for Plasma/Auxiliary/Carrier feed: Argon
Feed speed (IG): 5 g/min
Plasma gas flow rate: 15 l/min
Auxiliary gas flow rate: 1.5 l/min
Carrier gas flow rate: 1 l/min
RF: 40 MHz
Power: ~1400 W The expansion temperature of was 1300° C. and the transit time was around 0.2 seconds. The resulting expanded graphite (EG) had an apparent density of ~2.5 g/l and a C/O ratio of around 150:1. The expanded graphite was then dispersed in 1000 mL of deionized water containing naphthalene sulfonate as dispersing agent in the amount of 10% by weight with respect to the amount of expanded graphite, until obtaining a suspension. The dispersing agent was composed of an aromatic nonpolar group (naphthalene), having high affinity for graphite, and a polar group (sulfonate) that promotes graphite/water affinity.

For the treatment with ultrasounds, which produces exfoliation and reduction in size of the expanded graphite, an energy level of 400 W (UIP400S, Hielscher) for a duration of 15 hours was used.

The final dispersion had a graphene concentration of 7.5% by weight. This dispersion was diluted 1:1000 in deionized water and added dropwise to a silicon oxide substrate placed on a plate heated to 100° C. The substrate was analyzed with the scanning electron microscope (SEM). It was found that the nanographene platelets had a lateral size in the range of 500-3000 nm, and a thickness in the range of 0.34-15 nm.

EXAMPLE 2

The procedure of example 1 was repeated with the following variations.

100 g of the same commercial IG were expanded at an ultrasound energy level of 400 W (UIP400S, Hielscher) obtaining exfoliation and size reduction for a period of 30 hours. The final dispersion had a graphene concentration of 10% by weight.

The final dispersion was diluted 1:1000 in deionized water and added dropwise to a silicon oxide substrate placed on a plate heated to 100° C. The substrate was analyzed with the scanning electron microscope (SEM). It was found that the nanographene platelets had a lateral size in the range of 200-2000 nm, and a thickness in the range of 0.34-10 nm.

EXAMPLE 3

The procedure of example 1 was repeated with the following variations.

200 g of the same commercial IG were expanded at an ultrasound energy level of 400 W (UIP400S, Hielscher) obtaining exfoliation and size reduction for a period of 60 hours. The final dispersion had a graphene concentration of 20% by weight.

The final dispersion was diluted 1:1000 in deionized water and added dropwise to a silicon oxide substrate placed on a plate heated to 100° C. The substrate was analyzed with the scanning electron microscope (SEM). It was found that the nanographene platelets had a lateral size in the range of 100-1000 nm, and a thickness in the range of 0.34-6 nm.

EXAMPLE 4

200 g of commercial intercalated graphite flakes (IG), purchased from GK (ES 250 F5 grade), having a lateral size of approximately 300 μm, were expanded by feeding the IG through an Argon gas plasma (feeding rate 5 g/min, Ar flow: Plasma=15 l/min, Auxiliary=1.5 l/min, Carrier=1 l/min, RF=40 MHz, P~1400 W). The plasma was generated with an ICP-OES from Agilent (710 Series), where the spectrometer stage was removed. The expansion temperature was at least 1300° C. and the transit time of approximately 0.2 second. The resulting expanded graphite (EG) had an apparent density of ~2.5 g/l and a C/O ratio of about 20:1. The EG was then dispersed in 1,000 mL of deionized water, containing 10% by EG weight of the anionic surfactant sodium cholate, to obtain a suspension. The nonionic surfactant comprises an apolar aromatic group, with high affinity to graphite lattice, and a polar group which promotes graphite/water affinity. An ultrasonic energy level of 400 W (UIP400S, Hielscher) was used for exfoliation and particle sizes reduction for a period of 60 hours.

Since there was a tendency to foaming, tributoxyethyl phosphate as deaerating agent was added to the dispersion in equal amount (i.e. 10% by EG weight) as the nonionic surfactant. Both sodium cholate and tributoxyethyl phosphate were purchased from Sigma Aldrich.

The final dispersion was diluted 1:1,000 in deionized water and drop-casted onto a silicon dioxide substrate, placed on top of an hot-plate at 100° C. The substrate was analysed by scanning electron microscopy (SEM), showing an average nano graphene sheets lateral size in the range 500-10,000 nm, and a thickness in the range 0.5-15 nm.

EXAMPLE 5

The procedure of Example 4 was repeated with the following parameters.

200 g of the same commercial IG was expanded The EG was then dispersed in 1,000 mL of deionized water, containing 10% by EG weight of the non ionic surfactant polyvinylpyrrolidone as dispersing agent, to obtain a suspension. An ultrasonic energy level of 400 W (UIP400S, Hielscher) was used for exfoliation and particle sizes reduction for a period of 60 hours. The final dispersion was diluted 1:1000 in deionized water and drop-casted onto a silicon dioxide substrate, placed on top of an hot-plate at 100° C. The substrate was analysed by scanning electron microscopy (SEM), showing an average nano graphene sheets lateral size in the range 500-5,000 nm and a thickness in the range 0.5-10 nm.

The invention claimed is:

1. A dispersion of nanoparticles consisting of graphene in water and a surfactant;
    wherein:
    the dispersion is substantially free from graphite;
    the concentration of said nanoparticles of graphene in water is from 7% to 50% by weight;
    the C/O ratio in said nanoparticles of graphene is ≥100:1;
    at least 90% of said nanoparticles of graphene have a lateral size (x, y) from 10 to 10,000 nm, and a thickness (z) from 0.34 to 30 nm, the lateral size being always greater than the thickness (x, y>z); and
    said surfactant is present in an amount from 1 to 20% by weight with respect to the weight of said nanoparticles of graphene and is an anionic surfactant, a nonionic surfactant or combination thereof.

2. The dispersion according to claim 1, wherein said nanoparticles of graphene have a lateral size (x, y) from 50 to 5,000 nm.

3. The dispersion according to claim 1, wherein said nanoparticles of graphene have a thickness (z) from 0.34 to 20 nm.

4. The dispersion according to claim 1, wherein said C/O ratio in said nanoparticles of graphene is greater than or equal to 150:1.

5. The dispersion according to claim 1, wherein said surfactant is present in an amount from 5 to 15% by weight with respect to the weight of said graphene.

6. The dispersion according to claim 1, wherein said surfactant is an anionic surfactant.

7. The dispersion according to claim 1, wherein the concentration of said nanoparticles of graphene is from 7% to 40% by weight.

8. The dispersion according to claim 1, wherein said nanoparticles of graphene have a lateral size (x, y) from 100 to 2,000 nm.

9. The dispersion according to claim 1, wherein said nanoparticles of graphene have a thickness (z) from 0.34 to 15 nm.

* * * * *